2,988,627
METAL ARC WELDING
Kenneth H. Koopman, Fanwood, N.J., assignor to Union Carbide Corporation, a corporation of New York
No Drawing. Filed Sept. 13, 1954, Ser. No. 455,795
2 Claims. (Cl. 219—74)

This application is a continuation-in-part of my application, Serial No. 362,147, filed June 16, 1953, for Carbon Steel Oxy-inert Monotomic Gas-Shielded Metal Arc Welding.

According to the present invention, there is provided a new process of sigma (shielded-inert-gas-metal arc) welding (flux-free and with a bare welding wire), with carbon dioxide that is preferably bone dry as the arc shielding gas, of even rimmed steel at a much faster rate and with considerably less porosity and brittleness than was possible heretofore. This is accomplished mainly by the use of a so-called "triple-deoxidized" wire electrode containing at least three residual deoxidizing elements, which is disclosed in my application, Serial No. 362,147. Additionally, the invention includes the employment of a constant potential power source and an ultra-short arc technique with superior results, especially at straight polarity (electrode negative), although the invention does not exclude welding at reverse polarity (electrode positive), or with alternating current.

Porosity in carbon steel weld metal is the result of the carbon-oxygen reaction which produces carbon monoxide and carbon dioxide. These gases are trapped in the freezing puddle as porosity. The carbon consumed in such reaction is present as an element in the welding wire and base plate. The reacting oxygen normally originates from:

(1) Oxygen occluded in the welding wire and base plate.
(2) The ambient atmosphere because of insufficient shielding.
(3) Rust and mill scale on the plate.
(4) Oxygen content of the shielding gas.

The carbon is usually free and ready to combine with oxygen; therefore, the higher the carbon content of the base metal, the greater is the tendency to form porosity. Free oxygen combines more readily with many other elements, if present, than with carbon. In steelmaking, silicon is the most common element used to remove oxygen by chemical combination. This practice is referred to as deoxidizing or "killing" the steel.

In welding, the combination of silicon and oxygen forms non-gaseous oxides which either float to the surface of the weld puddle or remain as negligible minute particles. It is the affinity of silicon for oxygen which accounts for the variation in weldability with silicon content. Therefore, the relationship between carbon and silicon in the analysis of carbon steel base metal largely determines the porosity forming potential as illustrated in FIG. 1 of the application, Serial No. 386,738, by myself and Breymeier, Telford and McElrath, filed October 19, 1953, for Metal Arc Welding, now abandoned and also in the March, 1954, Welding Journal, page 203, FIG. 3.

A study was made of approximately thirty steel compositions in the form of plates obtained from various suppliers. The plate thickness varied from ¼-in. to 1½-in. Butt welds were made in all of these materials using normal welding techniques and electrode welding wire ("Oxweld" #32 CMS wire—sold by the Linde Air Products Company, a division of Union Carbide and Carbon Corporation). On examination of the radiographs of approximately 300 feet of butt welds, the occurrence of porosity could be correlated to the carbon and silicon content of the base plate. Plotted on a graph (FIG. 1 of said application Serial No. 386,738) showing silicon and carbon contents, the various steels are divided into three groups according to porosity formation.

Steels in group I were readily weldable by the sigma welding process with 5% oxy-argon, with very low porosity formation surpassing the X-ray requirements of the UW–51 ASME Code for unfired pressure vessels. Steels in group II were found to contain objectionable small scattered porosity which could be reduced by paying strict attention to workmanship and welding conditions. Group III consists of steels containing relatively high carbon and low silicon contents; all welds in these steels exhibited gross porosity.

A preliminary step in preparing the weldability chart (FIG. 1 of said application Serial No. 386,738) was to carefully examine the radiographs and tabulate the porosity count. The details of this examination are illustrated in the table of FIG. 2 on such, page 203 of said March, 1954, Welding Journal. Physical properties and chemical analysis of all the steels used are tabulated in the table of FIG. 1 on page 202 of said March, 1954, Welding Journal.

The analysis of such weldability program served to outline the full extent of the problem. First, it is known that by far the largest tonnage of steel used falls in the group III category, where the porosity formation is at its maximum. Also, steel from a given grade or specification could vary from heat to heat across the range of group weldability. For example, the analysis of two heats of ASTM Grade A–7 plate fell in group I and group II, respectively. This is possible, since the specification for A–7 plate is one of tensile strength, thus the chemical composition could actually be found in any of the three groups.

A great many gases have been studied in an effort to solve the porosity problem involved in sigma welding carbon steel. The use of carbon dioxide as a shielding gas was found to be very satisfactory by Thomas, Wickham, and Skinner as disclosed in their application that was filed August 31, 1954, for the sigma welding of group I steels; in fact, porosity-free welds were reproducibly made by them. Such reduction in porosity with $CO_2$ over that normally obtained when using argon is probably caused by the partial breakdown of the carbon dioxide to carbon monoxide and oxygen. According to the Law of Mass Action, the presence of the carbon monoxide above the weld puddle restricts or prevents the carbon-oxygen reaction from occurring. Therefore, it is possible to make satisfactory welds using carbon dioxide shielding gas in all steels whose composition falls within the group I classification.

It is to be understood that the novelty of my invention includes the combination of $CO_2$ plus the use of a special welding wire having a minimum of three residual deoxidizing elements of the class comprising silicon, titanium, zirconium, and aluminum. Since it is very difficult and practically impossible to make sound welds in the group II and III steels using argon and conventional welding wire, the problem of using carbon dioxide as a shielding medium for welding these steels is greatly magnified because of the excess oxygen which is present both in the base plate and shielding atmosphere.

I prefer such special wire to be composed of at least three and preferably all of the following four residual alloy deoxidizers in carbon steel electrode and/or filler wire: silicon (0.05%–1.00%), titanium (0.01%–0.50%), zirconium (0.01%–0.40%) and aluminum (0.01%–0.50%).

To make satisfactory or sound welds in such steels using carbon dioxide as a shielding gas, I discovered that such special wire unexpectedly solved the problem. This special welding wire (as disclosed in my application Serial No. 362,147) contains multiple, residual deoxidizers which are free to combine with the excess oxygen which normally would react with the carbon of the base metal to form porosity.

More than two residual deoxidizers in the steel electrode are much more effective in eliminating porosity in the weld metal than one or two. Apparently, an additional or reinforcing effect results so that a relatively small percentage of three or more different residual deoxidizers, such as aluminum, zirconium, titanium, and silicon consistently produce sound welds with a carbon dioxide shielding gas in the group II and III steels as well as in the group I steels. Calcium, magnesium, chromium, vanadium, and manganese are also beneficial.

Although a specific choice of deoxidizer content in an electrode composition has been previously disclosed for the purpose of eliminating the formation of undesirable inclusions in the weld deposit that might result from reaction of the molten metal with one or more components of the gaseous medium (air) surrounding the arc, mainly nitrogen, the purpose for using this special multiple, residual deoxidizer wire electrode is to make sound welds in a carbon dioxide shielding atmosphere.

In the manufacture of steels of the rimmed type (group II and group III steels) solidification in the mold is induced prior to the completion of the carbon-oxygen reaction. Such reaction may be represented by the equation $C+FeO=CO+Fe$. As a result of the evolution of gas as indicated in the reaction, these steels are porous in the as-cast state, but are usually sound when hot rolled or otherwise hot worked, since the blow holes or pores have been sealed or compressed during the hot working operation. However, when such a steel containing FeO or CO is remelted, the above reaction is resumed with consequent gas evolution.

The welding of this rimmed type of steel using conventional electrodes with the inert gases or carbon dioxide results in the formation of a porous weld. Even low carbon semi-killed steels welded with the inert gas will frequently exhibit this condition because of the high temperatures employed and the oxidizing action of the air which may be entrapped or by the intentional addition of oxygen which may be added to stabilize the arc. These existing conditions tend to eliminate the deoxidizers as effective agents and thus renew the carbon-oxygen reaction during the welding process. Therefore, for the welding of such rimmed type steels it is essential that a surplus or residual amount of deoxidizers be present in the welding wire.

TABLE I

*Effect of invention on porosity*

[Hand operation, special wire, d.c.r.p. power, gas flow 50 c.f.h.]

| Atmosphere | Steel | Amps. | Volts | Comments |
|---|---|---|---|---|
| 5% $O_2$-Argon | Group 2 | 350 | 23 | Scattered porosity. |
| 5% $O_2$-Argon | Group 2 | 350 | 28 | Do. |
| $CO_2$ | Group 1 | 220-300 | 27-29 | 4 passes—porosity free. |
| $CO_2$ | Group 1 | 220-300 | 27-29 | Do. |
| $CO_2$ | Group 2 | 250-320 | 24-30 | 13 passes—porosity free. |
| $CO_2$ | Group 3 | 240-340 | 23-28 | 4 passes—porosity free. |

The data tabulated in Table I shows that all three groups of steel can be welded with carbon dioxide as the shielding gas without obtaining evidence of any porosity by using the welding wire of the invention. This was even true when as many as thirteen passes were used on a ¾-in. thick steel plate. In comparison, if the groups II and III steels were welded with 5% oxygen-argon shielding atmosphere and the new welding wire, the welds would contain a small amount of porosity which in some cases may be objectionable depending on the required quality. Thus, porosity-free welds can be made in any grade of steel using carbon dioxide shielding atmosphere in combination with such welding wire.

An additional novel, unexpected result was obtained with the new method in that an approximate 70% increase of welding speed was obtained. This increase in welding speed is apparent in Table II. For example, using the 5% oxygen-argon shielding atmosphere in combination with this new welding wire, the maximum speed obtainable was approximately 103 in./min. Whereas using carbon dioxide as the shielding atmosphere, speeds of 175 to 300 in./min. were attained with such special wire. The welding action was so stable even at such higher-than-normal speeds as to indicate that still greater speeds are possible according to my invention.

TABLE II

*Effect of invention on maximum welding speed*

| Atmosphere | Amps. | Volts | Power Supply | Speed |
|---|---|---|---|---|
| 5% $O_2$-Argon | 375 | 20 | DCRP, VC [1] | 103 |
| $CO_2$ | 410 | 22 | DCRP, VC [1] | 120 |
| $CO_2$ | 500 | 22 | DCRP, CP [2] | 125 |
| $CO_2$ | 500 | 23 | DCRP, CP [2] | 141 |
| $CO_2$ | 610 | 26 | DCRP, CP [2] | 175 |

[1] VC—voltage control to maintain constant arc voltage with convention drooping characteristic power supply.
[2] CP—constant potential source of welding current.

In the practice of my invention, an ultra-short arc technique is preferred. Although this ultra-short arc is somewhat difficult to measure, it can be best described as follows. The arc length is approximately 50% of that of the conventional metal electrode welding short arc. This ultra-short arc is further characterized by its appearance in that it is normally below the surface of the plate. The technique of using the ultra-short arc has been found to be a preferred element of the invention. A further preferred element is the employment of a power source having a volt-ampere characteristic essentially flat or slightly rising.

A further unexpected result in the welding method of the invention is that the long sought use of straight polarity (D.C.) is now possible and practical. Heretofore industrial applications have been confined to the use of reverse polarity welding power. It has long been thought that straight polarity would give certain advantages such as higher deposition rates, decreased penetration, and increased burn-off rate—all now possible with this new method.

A further unusual result is that the arc is much more stable than has heretofore been experienced.

The carbon dioxide shielding medium can be diluted with some other gas, such as oxygen, argon and/or helium or mixtures thereof, within the scope of my novel welding method. However, since cost is an important consideration, it would be uneconomical to dilute the carbon dioxide because carbon dioxide is one of the cheapest shielding atmosphere presently available. The introduction of any additional gas or gases into the carbon dioxide shielding atmosphere would proportionately increase the cost of the operation.

Welds made according to the invention are not brittle when tested at room temperature, which is an unexpected improvement over the prior art. Furthermore, sound porosity-free welds have been made according to my invention with welding current of over 600 amperes with 1/16" special wire, which is also a distinct advantage over the prior art where porosity became a problem at currents over about 370 amperes with Oxweld CMS 32 wire. The present invention makes possible the sigma welding of all grades of carbon steels with one of the cheapest ($CO_2$) gases that is commercially available. The undesirable effect of spatter in the torch is minimized by simply tilting the torch away from a perpendicular position with respect to the work surface.

I claim:

1. Gas shielded metal arc welding process which comprises discharging a stream of bone dry carbon dioxide gas against carbon steel work to be welded, striking an ultra-short electric welding arc in such gas stream, and feeding a bare metal wire into such arc that is composed of carbon steel containing at least three residual deoxidizers selected from the class consisting of silicon (0.05%–1.00%), titanium (0.01–0.50), zirconium (0.01%–0.40%) and aluminum (0.01–0.50), which deoxidizers effectively produce a sound weld by freely combining with any excess oxygen produced by the breakdown of such carbon dioxide that otherwise would react with carbon of the molten metal to form porosity, said ultra short arc being visibly below the surface of the work and being characterized by an arc voltage of not more than 30 volts between the end of such wire and the work being welded.

2. Gas shielded metal arc welding which comprises discharging a stream of gas shielding medium against steel work to be welded, striking an electric welding arc in such gas shielding medium stream, and feeding a bare metal wire electrode into such arc, characterized in that such gas shielding medium stream is selected from the class consisting of 100% commercially pure $CO_2$, mixtures of $CO_2$ and oxygen, $CO_2$ and argon, and $CO_2$ and helium, such electrode wire is composed of carbon steel containing at least three residual deoxidizers selected from the class consisting of silicon (0.05%–1.00%), titanium (0.01–0.50), zirconium (0.01%–0.40%) and aluminum (0.01–0.50), which deoxidizers effectively produce a sound weld by freely combining with any excess oxygen produced by the break-down of such carbon dioxide that otherwise would react with carbon of the molten metal to form porosity; and an arc voltage of not more than 30 volts is maintained between the end of such wire electrode which is visibly below the surface of the work during such welding operation.

References Cited in the file of this patent

UNITED STATES PATENTS

| | | |
|---|---|---|
| 903,826 | Arsem | Nov. 17, 1908 |
| 904,482 | Howell | Nov. 17, 1908 |
| 1,589,017 | Lincoln | June 15, 1926 |
| 1,954,296 | Keir | Apr. 10, 1934 |
| 1,954,297 | Keir | Apr. 10, 1934 |
| 2,140,237 | Leitner | Dec. 13, 1938 |
| 2,504,867 | Muller | Apr. 18, 1950 |
| 2,504,868 | Muller | Apr. 18, 1950 |
| 2,532,410 | Kennedy | Dec. 5, 1950 |
| 2,544,711 | Mikhalapov | Mar. 13, 1951 |
| 2,621,278 | Muller | Dec. 9, 1952 |
| 2,824,948 | Willigen et al. | Feb. 25, 1958 |

FOREIGN PATENTS

| | | |
|---|---|---|
| 668,831 | Germany | Dec. 10, 1938 |
| 527,009 | Belgium | Sept. 6, 1954 |